United States Patent
Yamaji

(10) Patent No.: US 9,026,155 B2
(45) Date of Patent: May 5, 2015

(54) LOGGING SYSTEM FOR WIRELESS COMMUNICATION AND WIRELESS DEVICE

(75) Inventor: Masato Yamaji, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 1032 days.

(21) Appl. No.: 12/706,399

(22) Filed: Feb. 16, 2010

(65) Prior Publication Data

US 2010/0210294 A1 Aug. 19, 2010

(30) Foreign Application Priority Data

Feb. 19, 2009 (JP) ................................. 2009-036733

(51) Int. Cl.
*H04B 7/00* (2006.01)
*H04W 24/08* (2009.01)
*H04L 29/06* (2006.01)

(52) U.S. Cl.
CPC ............ *H04W 24/08* (2013.01); *H04L 63/1425* (2013.01)

(58) Field of Classification Search
CPC . H04L 12/2602; H04L 43/106; H04L 63/123; H04L 63/1425; H04L 41/06; H04L 41/069; H04L 43/04; H04L 43/045; H04L 41/142; H04L 41/147; H04L 41/0631; H04L 41/064; H04W 88/02; G06F 21/552; G06F 2221/2101; G06Q 10/00; G06Q 30/0246; G06Q 30/0254
USPC ........ 455/423, 67.11, 67.13, 550.1, 561, 418, 455/414.3, 457, 454, 414.1, 412.1, 425, 455/67.7; 709/219, 226, 245, 207, 224, 709/203; 714/39, 48, 57
See application file for complete search history.

(56) References Cited

U.S. PATENT DOCUMENTS

| | | | |
|---|---|---|---|
| 6,789,182 B1* | 9/2004 | Brothers et al. ................ | 712/30 |
| 7,706,740 B2* | 4/2010 | Collins et al. ................ | 455/3.01 |
| 7,809,681 B2* | 10/2010 | Nakamura .................... | 707/610 |
| 8,296,396 B2* | 10/2012 | Farber et al. .................. | 709/219 |
| 2006/0198359 A1* | 9/2006 | Fok et al. ...................... | 370/351 |
| 2007/0033233 A1* | 2/2007 | Hwang et al. ................. | 707/200 |
| 2009/0157839 A1* | 6/2009 | Diederichs et al. .......... | 709/208 |
| 2009/0323880 A1* | 12/2009 | Filer .............................. | 375/376 |
| 2010/0211826 A1* | 8/2010 | Villella et al. ................. | 714/39 |

(Continued)

FOREIGN PATENT DOCUMENTS

| | | |
|---|---|---|
| JP | 10178369 A | 6/1998 |
| JP | 2001221874 A | 8/2001 |

(Continued)

OTHER PUBLICATIONS

Japanese Office Action corresponding to Japanese Patent Application No. 2009-036733, mailed Feb. 22, 2011.

(Continued)

*Primary Examiner* — Sujatha Sharma
(74) *Attorney, Agent, or Firm* — Sughrue Mion, PLLC

(57) ABSTRACT

A logging system includes a plurality of receiving wireless devices, and a logging device. Each receiving wireless device receives a communication content of a target wireless device by using a corresponding channel. Each receiving wireless device outputs a log that shows a communication status of the corresponding channel. A logging device collects the log that is output from each of the plurality of receiving wireless devices.

16 Claims, 3 Drawing Sheets

(56) References Cited

U.S. PATENT DOCUMENTS

| | | | |
|---|---|---|---|
| 2011/0250880 A1* | 10/2011 | Olsson | 455/423 |
| 2012/0120922 A1* | 5/2012 | Huang et al. | 370/332 |
| 2012/0131185 A1* | 5/2012 | Petersen et al. | 709/224 |

FOREIGN PATENT DOCUMENTS

| | | | |
|---|---|---|---|
| JP | 2002158622 A | 5/2002 | |
| JP | 2004158945 A | 6/2004 | |
| JP | 2006074326 A | 3/2006 | |
| JP | 2008535402 A | 8/2008 | |
| WO | 2006105296 A1 | 10/2006 | |

OTHER PUBLICATIONS

SmartRF™ Protocol Packet Sniffer User Manual Rev. 1.10, Texas Instruments, URL: http://focus.ti.com/lit/ug/swru187b/swru187b.pdf, pp. 1-27.

WiSens™ Classic Packet Sniffer —IEEE 802.15.4/ZigBee™, BzWorks, URL: http://www.bzworks.com/library/downloads/WiSens_Datasheet.pdf, pp. 1-2.

"An advanced wireless packet sniffer can help you get the full picture of your 802.11 WLAN traffic", TamoSoft, URL: http://www.tamos.com/products/commwifi/wifi-sniffer.htm, pp. 1-2.

* cited by examiner

LOGGING SYSTEM FOR WIRELESS COMMUNICATION AND WIRELESS DEVICE

BACKGROUND OF THE INVENTION

1. Field of the Invention

The present invention relates to a logging system for wireless communication and a wireless device that is used in the logging system and performs communication wirelessly. The logging system of the present invention collects a log showing a communication status of the wireless device.

Priority is claimed on Japanese Patent Application No. 2009-036733, filed Feb. 19, 2009, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In developing or setting a wireless device, collection of a log that shows an actual communication status of the wireless device and confirmation of contents of the log are performed. These are performed to confirm that the wireless device functions properly, and are very important. It is necessary to collect the log without affecting the communication performed by the wireless device. This is achieved, for example, by a method that uses a plurality of wireless devices. The log of a target wireless device is a target that is collected. A receiving wireless device that is different from the target wireless device receives or captures the log of the target wireless device.

When the log that shows the communication status of the target wireless device is collected by using the above method, a logging system that connects the receiving wireless device and a logging device with a communication cable is used. The logging device is achieved by a personal computer or the like. In this case, a channel on which the receiving wireless device performs capturing is set, and an operational mode of the logging system is set as a promiscuous mode. The promiscuous mode is a mode in which all data that are communicated on the set channel are received regardless of the destination of the data.

After the above settings are finished, the receiving wireless device starts capturing by an instruction of starting. The instruction of starting is output from the logging device and received by the receiving wireless device. After the capturing is started, the log captured by the receiving wireless device is collected in the logging device through the communication cable sequentially. A time stamp showing a time when the log is collected to the logging device is attached to the log. The log with the time stamp is recorded in the logging device. The log collected in the logging device is arranged by the time stamp, and the communication status of the target wireless device is confirmed in time sequence. Details of the conventional logging system for wireless communication are described in the following nonpatent literatures.

[Nonpatent Literature 1]
SmartRF™ Protocol Packet Sniffer User Manual Rev. 1.10, Texas Instruments, URL: http://focus.ti.com/lit/ug/swru187b/swru187b.pdf

[Nonpatent Literature 2]
WiSens™ Classic PACKET SNIFFER-IEEE 802.15.4/ZigBee™, BzWorks, URL: http://www.bzworks.com/library/downloads/WiSens_Datasheet.pdf

[Nonpatent Literature 3]
An advanced wireless packet sniffer can help you get the full picture of your 802.11 WLAN traffic, TamoSoft, URL: http://www.tamos.com/products/commwifi/wifi-sniffer.htm In the conventional logging system described above, only the log that shows the communication status of the channel that is set beforehand can be collected. The log that shows the communication status of the channel other than the channel that is set up beforehand cannot be collected. Therefore, in the communication method that uses a plurality of channels and switches the current channel or in the communication method that uses the plurality of channels in parallel, the log that is necessary to confirm the communication status when developing or setting the wireless device cannot be collected.

The communication method that uses the plurality of channels and switches the current channel is, for example, a Frequency Hopping Spread Spectrum method, hereinafter referred to as a FHSS method. In the FHSS method, the communication is performed with switching the current channel that is used in the data communication in a short time interval. The switching of the channel is to reduce a bad effect on the communication by noise from the outside. Typical examples of communication standards that use the above described method is Bluetooth™, IEEE 802.11, and the like.

When the switching pattern of the channel in the target wireless device is known, the log can be collected by switching the channel in the receiving wireless device in the same switching pattern as in the target wireless device. The channel switching in the target wireless device and the channel switching in the receiving wireless device need to be performed synchronously. The channel switching in the receiving wireless device needs to be performed in a short time. It is difficult to realize the above described method.

The above described communication method uses a plurality of channels at the same time. As a result, speed of data transmission can be increased. For example, in a mesh-type network, a specific channel is applied to the communication between specific wireless nodes, and information for controlling the communication is transmitted by using the specific channel. As a result, a plurality of wireless nodes that are in the area that radio waves can reach can perform communication at the same time. In the above described wireless system, a communication content of the specific channel may be influenced by a communication result of another channel. Therefore, the logs of all channels need to be collected, but the logs of all channels cannot be collected by the conventional logging system for wireless communication.

SUMMARY OF THE INVENTION

In view of the above circumstances, one embodiment of the present invention provides a logging system for wireless communication that can collect a log that is accurate in time sequence by the communication method that uses a plurality of channels. Another embodiment of the present invention also provides a wireless device that is used in the above logging system.

In one embodiment, a logging system includes a plurality of receiving wireless devices, and a logging device. Each receiving wireless device receives a communication content of a target wireless device by using a corresponding channel. Each receiving wireless device outputs a log that shows a communication status of the corresponding channel. A logging device collects the log that is output from each of the plurality of receiving wireless devices.

In another embodiment, a logging system for wireless communication may collect a log that shows a communication status of a target wireless device that performs a communication wirelessly. The logging system may include a plurality of receiving wireless devices each of which receives a communication content of the target wireless device through a corresponding channel, each of the plurality of receiving wireless devices outputting a log that shows a communication status of the channel, the log being attached a time stamp to, the time stamp showing a time when the communication status is received, and a logging device that collects the log that is output from each of the plurality of receiving wireless devices.

In still another embodiment, a wireless device may include a log generating unit that receives a communication content of a target wireless device by using a corresponding channel allocated to the log generating unit, the corresponding channel being established between the log generating device and the target wireless device, the log generating unit generating a log that shows a communication status of the corresponding channel.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE INVENTION

The invention will be now described herein with reference to illustrative embodiments. Those skilled in the art will recognize that many alternative embodiments can be accomplished using the teaching of the present invention and that the invention is not limited to the embodiments illustrated for explanatory purpose.

Figure 1:
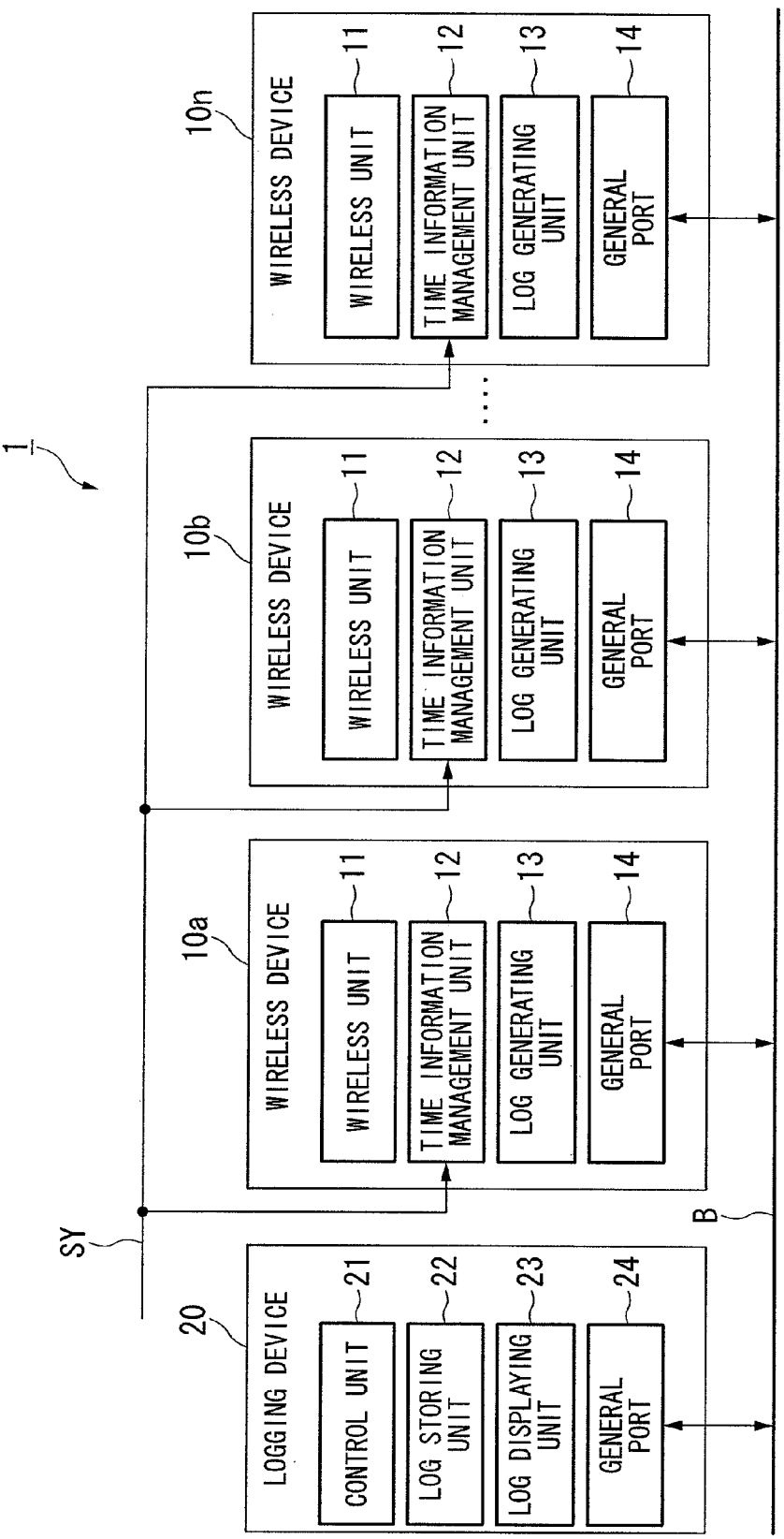
FIG. 1 is a block diagram showing a principal composition of a logging system for wireless communication and a wireless device in accordance with a first preferred embodiment of the present invention.

FIG. 1 is a block diagram showing a principal composition of a logging system for wireless communication and a wireless device in accordance with a first preferred embodiment of the present invention. The first preferred embodiment provides a logging system 1. The logging system 1 includes a plurality of wireless devices 10a, 10b, - - - , and 10n and a logging device 20. The plurality of wireless devices 10a, 10b, - - - , and 10n and the logging device 20 are connected to each other by a communication bus B. The logging system 1 receives or captures data that is communicated by a target wireless device that is a target of logging and is not illustrated in the figure. The logging system 1 collects a log that shows a communication status of the target wireless device.

The target wireless device performs communication by using a plurality of channels. Specifically, the target wireless device performs communication with switching the plurality of channels like the FHSS method, or performs communication using the plurality of channels at the same time. In the description bellow, the number of the wireless devices 10a, 10b, - - - , and 10n is greater than or equal to the number of channels that are used in the communication by the target wireless device.

Each of the wireless devices 10a, 10b, - - - , and 10n includes a wireless unit 11, a time information management unit 12, a log generating unit 13, and a general port 14. Each of the wireless devices 10a, 10b, - - - , and 10n receives a communication content of the target wireless device by using a channel that corresponds to each of the wireless devices 10a, 10b, - - - , and 10n. Each of the wireless devices 10a, 10b, - - - , and 10n outputs a log that shows the communication status of the target wireless device corresponding to the channel. A time stamp that shows the receiving time of the data is attached to the log that is output from each of the wireless devices 10a, 10b, - - - , and 10n.

The wireless unit 11 receives data that is communicated by using one of the plurality of channels that perform communication in the target wireless device. The setting of the selection of one channel from the plurality of channels is performed by the logging device 20, for example. When a channel selector switch such as a DIP switch is disposed on the wireless devices 10a, 10b, - - - , and 10n, a user can set the channel manually.

The time information management unit 12 manages the time stamp that is attached to the log based on a synchronizing signal SY. Specifically, the time information management unit 12 includes a timer that clocks a time that is not illustrated in the figure. The time information management unit 12 resets the timer when receiving the synchronizing signal SY. As a result, a time gap between the wireless devices 10a, 10b, - - - , and 10n is corrected, and accuracy of the time stamp is maintained. The wireless devices 10a, 10b, - - - , and 10n achieve a high accuracy time synchronization.

The frequency that the synchronizing signal SY is input is determined by the accuracy of the timer of the time information management unit 12 and a necessary synchronization accuracy between the wireless devices 10a, 10b, - - - , and 10n. The necessary synchronization accuracy between the wireless devices 10a, 10b, - - - , and 10n is based on a communication protocol that is a target of capturing. For example, when the necessary synchronization accuracy between the wireless devices 10a, 10b, - - - , and 10n is one millisecond, the synchronizing signal SY is input once a minute to each of the wireless devices 10a, 10b, - - - , and 10n.

The synchronizing signal SY may be input from outside of the logging system 1, or may be generated in the logging system 1. When the synchronizing signal SY is generated in the logging system 1, the synchronizing signal SY is preferably generated by one of the wireless devices 10a, 10b, - - - , and 10n or the logging device 20. When the synchronizing signal SY is generated by one of the wireless devices 10a, 10b, - - - , and 10n, the synchronizing signal SY is output from the one wireless device to the other wireless devices. When the synchronizing signal SY is generated by the logging device 20, the synchronizing signal SY is output from the logging device 20 to the wireless devices 10a, 10b, - - - , and 10n. In the description below, the synchronizing signal SY is generated by the wireless device 10a.

Figure 2:
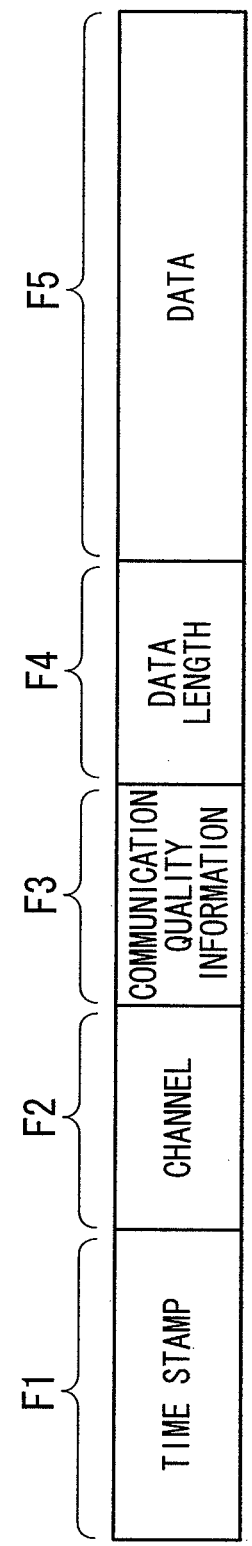
FIG. 2 is a view illustrating an example of the format of the log generated in the log generating unit of FIG. 1.

The log generating unit 13 generates the log that shows the communication status of the channel that the wireless unit 11 uses in receiving data. The generation of the log is based on the data that the wireless unit 11 receives. A time stamp that shows the time that the wireless unit 11 receives the data is attached to the log. The attachment of the time stamp is performed by the log generating unit 13 based on the time that is controlled by the time information management unit 12. FIG. 2 is a view illustrating an example of the format of the log generated in the log generating unit 13.

As illustrated in FIG. 2, the log that is generated in the log generating unit 13 includes fields F1, F2, - - - , and F5. The field F1 is the field where the time stamp is stored. The field F2 is the field where information showing the channel that the wireless unit 11 uses in receiving data is stored. The field F3 is the field where information of the quality of the communication performed in the wireless unit 11 is stored. The information of the quality of the communication is such as the information showing the sensitivity or the level of receiving data. The field F4 is the field where information of the length of data received by the wireless unit 11 is stored. The field F5 is the field where the data received by the wireless unit 11 is stored.

The general port 14 connects the wireless devices 10a, 10b, - - -, and 10n and a communication bus B. A communication between the wireless devices 10a, 10b, - - -, and 10n and the logging device 20 is performed by the general port 14. The communication bus B is, for example, a serial bus such as a USB (Universal Serial Bus) or a network such as an Ethernet™. When the communication bus B is USB, the general port 14 is a USB interface. When the communication bus B is Ethernet™, the general port 14 is a NIC (Network Interface Card).

The logging device 20 includes a control unit 21, a log storing unit 22, a log displaying unit 23, and a general port 24. The logging device 20 controls the wireless devices 10a, 10b, - - -, and 10n through the communication bus B. The logging device 20 collects and stores the log generated in each of the wireless devices 10a, 10b, - - -, and 10n. The logging device 20 displays the log that is stored based on user's instructions. The control unit 21 controls the behavior of the logging device 20. The control unit 21 controls the wireless devices 10a, 10b, - - -, and 10n based on user's instructions. The control unit 21 performs various controls such as a control of the channel that each of the wireless devices 10a, 10b, - - -, and 10n uses in receiving data and a control of destination of the log that is generated in each of the wireless devices 10a, 10b, - - -, and 10n.

The log storing unit 22 collects and stores the log transmitted from each of the wireless devices 10a, 10b, - - -, and 10n through the communication bus B. The log storing unit 22 is, for example, a magnetic storage such as a hard disc apparatus or a semiconductor memory. The log displaying unit 23 includes a displaying apparatus such as a LCD (liquid crystal display). The log displaying unit 23 reads and displays the log stored in the log storing unit 22 based on user's instructions. The displaying of the log may be performed in order of the time stamp attached to each log. The general port 24 of the logging device 20 is like the general port 14 that is disposed on each of the wireless devices 10a, 10b, - - -, and 10n. The logging device 20 is realized by a personal computer, for example.

Figure 3:
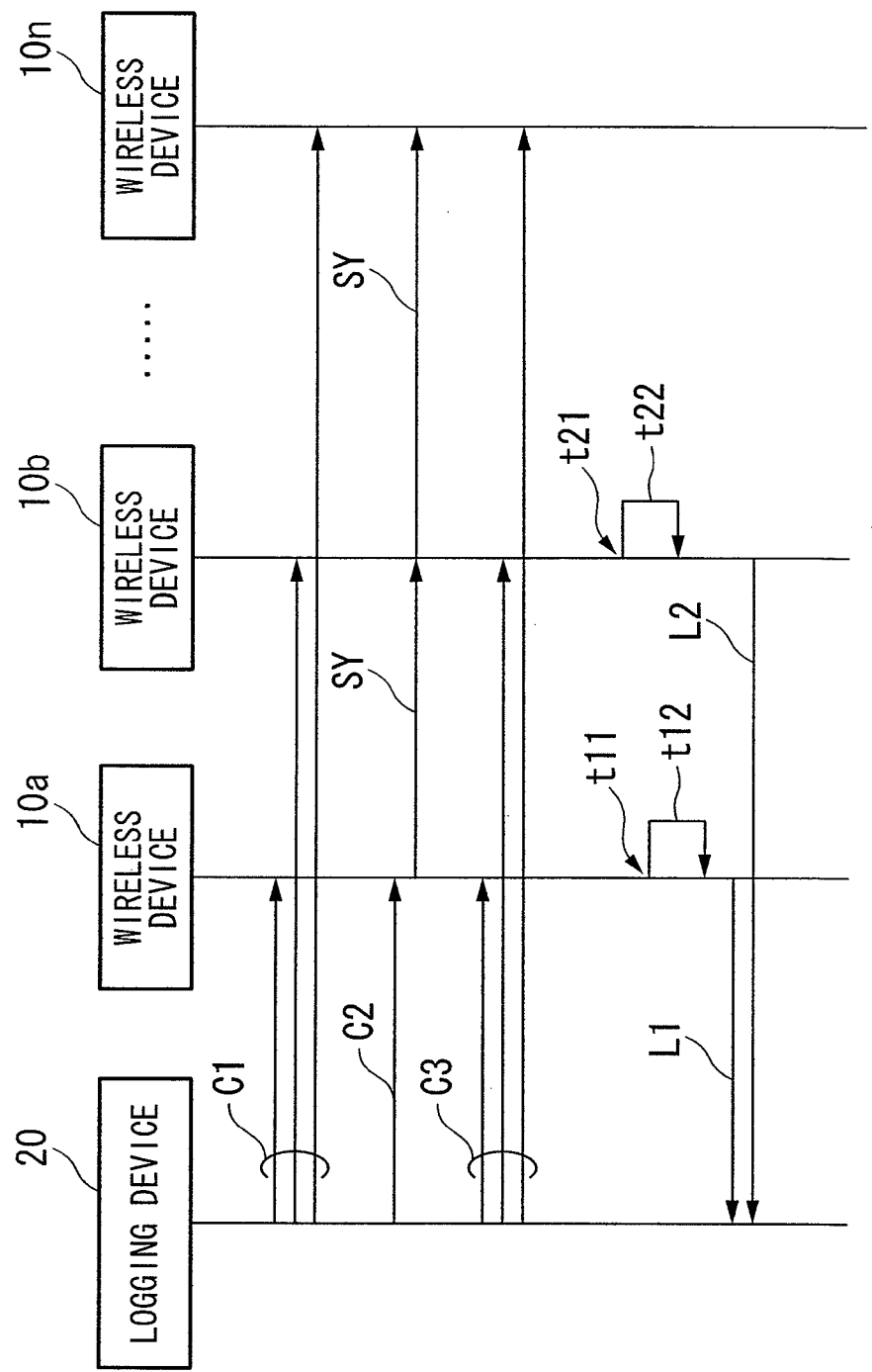
FIG. 3 is a timing chart showing a behavior of the logging system for wireless communication and the wireless device in accordance with a first preferred embodiment of the present invention.

A behavior of the logging system 1 of the above described configuration will be described. FIG. 3 is a timing chart showing a behavior of the logging system for wireless communication and the wireless device in accordance with a first preferred embodiment of the present invention. When the behavior of the logging system 1 is started by an instruction of user, a control signal C1 is transmitted from the logging device 20 to each of the wireless devices 10a, 10b, - - -, and 10n through the communication bus B. The transmitting of the control signal C1 is controlled by the control unit 21. The control signal C1 performs initial settings of the wireless devices 10a, 10b, - - -, and 10n.

When receiving the control signal C1, each of the wireless devices 10a, 10b, - - -, and 10n performs setting of the channel that the wireless unit 11 uses in receiving data. When the target wireless device performs communication using a first, second, - - -, n-th channels, the wireless device 10a performs setting to receive data on the first channel, the wireless device 10b performs setting to receive data on the second channel, - - -, and the wireless device 10n performs setting to receive data on the n-th channel. The destination of the log that is generated in each of the wireless devices 10a, 10b, - - -, and 10n is also set based on the control signal C1.

After the above described initial settings are finished, the synchronizing control signal C2 is output from the logging device 20 to the wireless device 10a through the communication bus B, which is controlled by the control unit 21. The synchronizing control signal C2 makes the wireless device 10a output the synchronizing signal SY. When receiving the synchronizing control signal C2, the wireless device 10a outputs the synchronizing signal SY. The synchronizing signal SY is received by each of the other wireless devices 10b, 10c, - - -, and 10n. The timer of the time information management unit 12 of each of the wireless devices 10a, 10b, - - -, and 10n is made reset at the same time. As a result, the wireless devices 10a, 10b, - - -, and 10n achieve a high accuracy time synchronization, the accuracy being one millisecond for example.

The control signal C3 is output from the logging device 20 to each of the wireless devices 10a, 10b, - - -, and 10n through the communication bus B. The outputting of the control signal C3 is controlled by the control unit 21. The control signal C3 instructs the start of collecting the log that shows the communication status of the target wireless device. When receiving the control signal C3, the wireless unit 11 of each of the wireless devices 10a, 10b, - - -, and 10n receives data that is communicated by using the channel that is set by the initial setting. The received data is the data that is selected from data of the target wireless device that performs communication by using the plurality of channels. In the example illustrated in FIG. 3, data is received at the timings t11 and t12 by each of the wireless devices 10a and 10b.

When the wireless unit 11 receives data, the received data is output from the wireless unit 11 to the log generating unit 13, and the time stamp showing the time when the data is received is output from the time information management unit 12 to the log generating unit 13. The wireless unit 11 outputs not only the received data. The wireless unit 11 also outputs information of the channel that is set, information of communication quality, and length of the received data.

After receiving the above described data, the time stamp, and various information, the log generating unit 13 generates the log with the time stamp that is in the format illustrated in FIG. 2. In the example illustrated in FIG. 3, the log is generated at the timings t12 and t22 in each of the wireless devices 10a and 10b. The generated log is output to the logging device 20 through the general port 14 and the communication cable B. In the example illustrated in FIG. 3, a log L1 is output from the wireless device 10a to the logging device 20, and a log L2 is output from the wireless device 10b to the logging device 20. The above described behavior is performed in each of the wireless devices 10a, 10b, - - -, and 10n respectively.

The logging device 20 receives the log output from the wireless devices 10a, 10b, - - -, and 10n. The log storing unit 22 collects and stores the log through the general port 24. By repeating the above process, the logging device 20 collects and stores the log that shows the communication status of each channel that the target wireless device uses. During the above process, the synchronizing signal is output from the wireless device 10a to the other wireless devices 10b, - - -, 10n at regular intervals, for example, at one minute interval. As a result, the wireless devices 10a, 10b, - - -, and 10n keep a high accuracy time synchronization.

After collecting of the log is finished and instruction of displaying the log is performed by user, the log stored in the log storing unit 22 is read out by the log displaying unit 23 of the logging device 20 and is displayed on the displaying apparatus disposed on the logging device 20 that is not illustrated in the figure. When user instructs arrangement of the log in order of the receiving time, the log displaying unit 23 performs arrangement of the log that is displayed in the displaying unit in order of the time stamp attached to each log. In the above description, displaying of the log by the log displaying unit 23 is performed after collecting of the log, but may be performed during collecting of the log. If displaying of the log by the log displaying unit 23 is performed during collecting of the log, the log displaying unit 23 displays the log on the displaying apparatus arranging the log in order of the time stamp.

The time stamp attached to the log shows the time when each of the wireless devices 10a, 10b, - - - , and 10n receives data. The time stamp is not the time when the logging device 20 receives data from each of the wireless devices 10a, 10b, - - - , and 10n. Therefore, influence of processing time between the time when data is output from the wireless devices 10a, 10b, - - - , and 10n and the time when data is received by the logging device 20 can be excluded. Also, influence of delay time caused by the communication bus B can be excluded. The log arranged in order of the time stamp and displayed is accurate in time series.

Whether the target wireless device is a device that performs communication switching a plurality of channels like the FHSS method or a device that performs communication using a plurality of channels at the same time, the log can keep the time order and be collected accurately in time series. The synchronizing signal SY is output at regular intervals to make the wireless devices 10a, 10b, - - - , and 10n keep a high accuracy time synchronization. Therefore, there is no problem if time lag of one or more wireless devices occurs. As described above, the necessary log that is accurate in time series and shows the condition of the communication that is performed using a plurality of channels can be collected.

In recent years, a wireless system using a plurality of wireless standards is constructed. This wireless system utilizes the characteristic of each of the plurality of wireless standards such as high speed, low power, and high reliability. The performance of the wireless system is improved, or the wireless system becomes convenient. For example, the wireless device of one end of the wireless system uses the wireless standard of low power to drive a battery. And the wireless device of the center of the wireless system uses the wireless standard of high speed to increase the speed of communication.

It is difficult for the conventional logging system alone to collect and manage the log of the above-mentioned wireless system in bulk. A plurality of logging system corresponding to the plurality of wireless standards is necessary. It is difficult to synchronize the plurality of logging system only by disposing the plurality of logging system. It may be impossible to reflect the timing of receiving the log when integrating the log that is received by each of the plurality of logging system.

The logging system of the present invention can collect the log of the wireless system in bulk. Specifically, the wireless devices 10a, 10b, - - - , and 10n of FIG. 1 may correspond to the plurality of wireless standards. For example, the wireless devices 10a and 10b may correspond to the wireless standard of low power such as IEEE 802.15.4. The wireless device 10n may correspond to the wireless standard of high speed such as IEEE 802.11g. The wireless devices 10a and 10b are set to use a different channel of the plurality of channels that are used in the wireless standard of low power each other.

The log to which the time stamp is attached is generated in each of the wireless devices 10a, 10b, - - - , and 10n of the logging system of the present invention. The time stamp shows the time when the data is received. Even if the logging system uses the plurality of wireless standards, the necessary log that is precise in time series and shows the communication status of the plurality of channels can be collected.

While the logging system and the wireless device of the preferred embodiments of the present invention have been described and illustrated above, it should be understood that these are exemplary of the invention and are not to be considered as limiting. Additions, omissions, substitutions, and other modifications can be made without departing from the spirit or scope of the present invention. For example, in the above description, the wireless devices 10a, 10b, - - - , and 10n and the logging device 20 are connected by the communication bus B, which is a bus-type connection. But each of the wireless devices 10a, 10b, - - - , and 10n and the logging device 20 may be connected one-to-one, which is a star-type connection. The other type of connection may be used.

In the preferred embodiments described above, the log generated in each of the wireless devices 10a, 10b, - - - , and 10n is in the format of FIG. 2. But the format of the log generated in each of the wireless devices 10a, 10b, - - - , and 10n is not limited to the format of FIG. 2. The log that is generated may be in any format that includes at least the time stamp and the data received by the wireless unit 11.

In the preferred embodiments described above, the logging device 20 outputs the control signal C1 to perform the initial settings to each of the wireless devices 10a, 10b, - - - , and 10n before the logging device 20 collects the log. But the outputting of the control signal C1 may be omitted if the initial settings are performed in each of the wireless devices 10a, 10b, - - - , and 10n and there is no need to perform the initial settings.

In the preferred embodiments described above, the logging system 1 may include a functional block to output the synchronizing signal SY or a synchronizing signal outputting unit to operate the functional block. The logging system 1 may include a synchronizing instruction input unit such as a button input unit for the operator to input a trigger signal. The trigger signal makes the wireless device, the logging device, and the synchronizing signal outputting unit output the synchronizing signal SY. In this case, the wireless device, the logging device, and the synchronizing signal outputting unit output the synchronizing signal SY based on the trigger signal output from the synchronizing instruction input unit.

Accordingly, the invention is not to be considered as being limited by the foregoing description, and is only limited by the scope of the appended claims.

What is claimed is:

1. A logging system for wireless communication comprising:
a first receiving wireless device configured to receive, from a target wireless device, first data by using a first channel, the first receiving wireless device also being configured to generate a first log, including a first time stamp, first channel information, first communication quality information, and the first data, the first receiving wireless device further being configured to output the first log, the first time stamp showing a first time when the first data is received, the first channel information showing the first channel, and the first communication quality information showing a communication quality of the first receiving wireless device;

a second receiving wireless device configured to receive, from the target wireless device, second data by using a second channel, the second receiving wireless device being configured to generate a second log, including a second time stamp, second channel information, second communication quality information, and the second data, the second receiving wireless device also being configured to output the second log, the second time stamp showing a second time when the second data is received, the second channel information showing the second channel, and the second communication quality information showing a communication quality of the second receiving wireless device; and a logging device configured to collect the first log from the first receiving wireless device, and collect the second log from the second receiving wireless device, wherein the first and second receiving wireless devices are disposed separately from the target wireless device.

2. The logging system for wireless communication according to claim 1, wherein the first receiving wireless device comprises:

a first time information management unit configured to manage the first time stamp based on a synchronizing signal, and the second receiving wireless device comprises:

a second time information management unit configured to manage the second time stamp based on the synchronizing signal.

3. The logging system for wireless communication according to claim 2, wherein the first receiving wireless device is configured to output the synchronizing signal to the second receiving wireless device.

4. The logging system for wireless communication according to claim 2, wherein the logging device is configured to output the synchronizing signal to the first and second receiving wireless devices.

5. The logging system for wireless communication according to claim 1, wherein the first receiving wireless device is configured to select the first channel from a plurality of channels that are used in a plurality of wireless standards, and the second receiving wireless device is configured to select the second channel from the plurality of channels.

6. The logging system for wireless communication according to claim 1, wherein the number of the first and second receiving wireless devices is not less than the number of channels that are used by the target wireless device.

7. The logging system for wireless communication according to claim 2, wherein the first time information management unit comprises a first timer, the first time information management unit is configured to reset the first timer when receiving the synchronizing signal, the second time information management unit comprises a second timer, and the second time information management unit is configured to reset the second timer when receiving the synchronizing signal.

8. The logging system for wireless communication according to claim 2, wherein the first receiving wireless device further comprises:

a first wireless unit configured to receive the first data that is transmitted by using the first channel; and a first log generating unit configured to generate the first log based on the first data received by the first wireless unit, and the second receiving wireless device further comprises:

a second wireless unit configured to receive the second data that is transmitted by using the second channel; and a second log generating unit configured to generate the second log based on the second data received by the second wireless unit.

9. The logging system for wireless communication according to claim 8, wherein the first log generating unit is configured to attach the first time stamp at a first timing that is controlled by the first time information management unit, and the second log generating unit is configured to attach the second time stamp at a second timing that is controlled by the second time information management unit.

10. The logging system for wireless communication according to claim 1, wherein the first log comprises:

a first field to store the first stamp;

a second field to store the first channel information;

a third field to store the first communication quality information of the first channel;

a fourth field to store first length information of the first data; and a fifth field to store the first data, and the second log comprises:

a sixth field to store the second time stamp;

a seventh field to store the second channel information;

an eighth field to store the second communication quality information of the second channel;

a ninth field to store second length information of the second data; and a tenth field to store the second data.

11. The logging system for wireless communication according to claim 1, wherein the logging device comprises:

a control unit configured to control the logging device and the first and second receiving wireless devices;

a log storing unit configured to collect and store the first and second logs; and a log displaying unit configured to read and display the first and second logs stored in the log storing unit.

12. The logging system for wireless communication according to claim 11, wherein the control unit is configured to control based on user's instructions.

13. The logging system for wireless communication according to claim 11, wherein the control unit is configured to control the first and second channels.

14. The logging system for wireless communication according to claim 11, wherein the control unit is configured to control destinations of the first and second logs.

15. The logging system for wireless communication according to claim 11, wherein the log displaying unit is configured to display the first and second logs based on user's instructions.

16. The logging system for wireless communication according to claim 11, wherein the log displaying unit is configured to display the first and second logs in order of the first and second time stamps.

* * * * *